Sept. 20, 1966　　　T. R. BROGAN　　　3,274,407
APPARATUS FOR MAGNETOHYDRODYNAMICALLY
GENERATING ELECTRIC ENERGY
Filed Feb. 2, 1961　　　　　　　　　　　4 Sheets-Sheet 1

THOMAS R. BROGAN
INVENTOR.

BY Alden D. Redfield
Melvin E. Frederick
ATTORNEYS

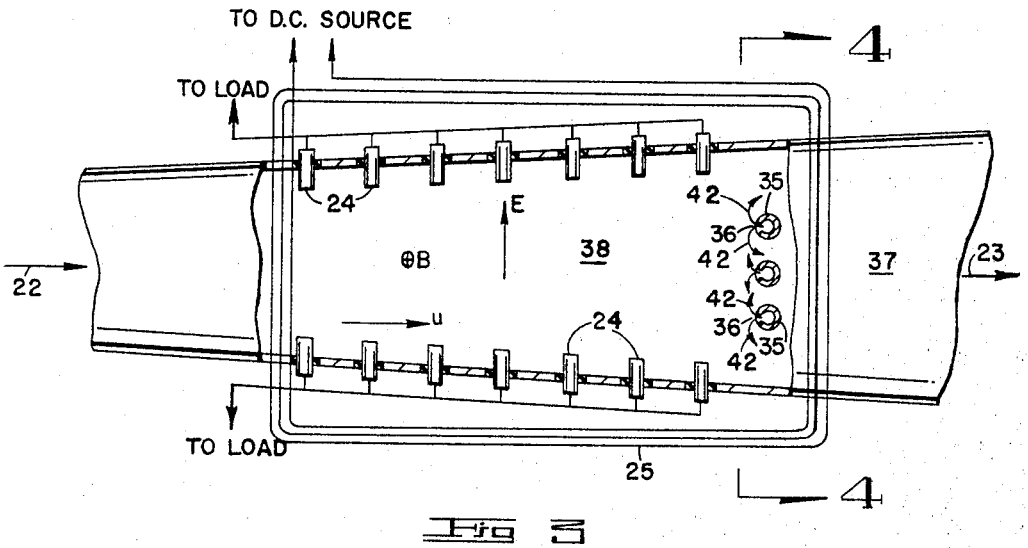
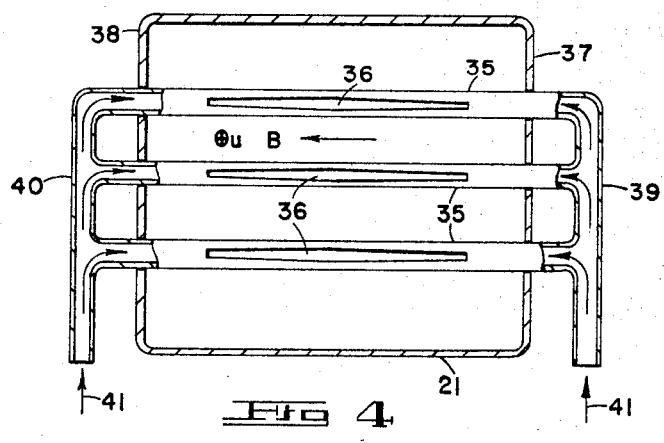
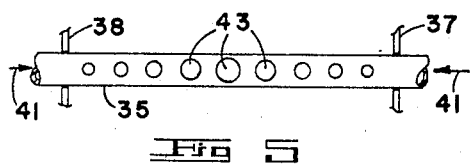
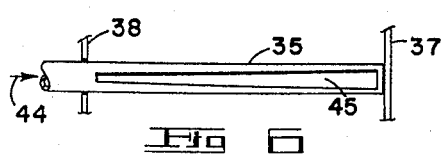

THOMAS R. BROGAN
INVENTOR.

BY Alden D. Redfield
Melvin E. Frederick
ATTORNEYS

Sept. 20, 1966     T. R. BROGAN     3,274,407
APPARATUS FOR MAGNETOHYDRODYNAMICALLY
GENERATING ELECTRIC ENERGY
Filed Feb. 2, 1961                    4 Sheets-Sheet 4

THOMAS R. BROGAN
INVENTOR.

BY Alden D. Redfield
Melvin E. Frederick
ATTORNEYS

United States Patent Office 3,274,407
Patented Sept. 20, 1966

3,274,407
APPARATUS FOR MAGNETOHYDRODYNAMICAL-
LY GENERATING ELECTRIC ENERGY
Thomas R. Brogan, Arlington, Mass., assignor to Avco
Corporation, Cincinnati, Ohio, a corporation of Delaware
Filed Feb. 2, 1961, Ser. No. 86,818
6 Claims. (Cl. 310—11)

The present invention relates to apparatus for magnetohydrodynamically generating electric energy and, more particularly, to improved apparatus for transforming the kinetic energy of an electrically conductive stream of fluid into electric energy.

In general terms, magnetohydrodynamic (hereinafter abbreviated "MHD") generators produce electrical power by movement of electrically conductive fluid relative to a magnetic field. The fluid employed is usually an electrically conductive gas from a high temperature, high pressure source. From the source, the fluid flows through the generator and, by virtue of its movement relative to the magnetic field, induces an electromotive force between opposed electrodes within the generator. The gas may exhaust to a sink, which may simply be the atmosphere; or, in more sophisticated systems, a recovery system including pumping means for returning the gas to the source.

Several different gases may be used; the gas may simply be air, combustion products, or may comprise inert gases, such as helium or argon. In open systems, i.e., those in which the gases are not recovered after passing through the power plant, air or combustion products are normally used. In closed systems, in which the gases are recovered and recirculated, it is feasible to use relatively expensive gases, such as helium and argon. To promote electrical conductivity, the gases are heated to high temperatures; conductivity may also be increased by the addition to the gases of a substance that ionizes readily at the operating temperature. Regardless of the gas used, it comprises a mixture of electrons, positive ions and neutral atoms which, for convenience, may be termed "plasma."

According to a well-known law in physics, the movement of an electrically conductive substance through a magnetic field induces an electromotive force at the edges of the substance which may be used to force an electric current through a work circuit.

When the substance is of an area greater than that of the magnetic field, the part of the substance extending beyond the magnetic field will permit the flow of eddy currents and may form a short circuit with respect to the electromotive force. The short circuit and eddy currents do not contribute to the flow of useful current and, consequently, result in losses and a reduction in generator efficiency.

It will be obvious that the electrically conductive gas of an MHD generator and the electrically conductive fluid such as liquid sodium in the case of electromagnetic pumps extend beyond the magnetic field associated therewith and that losses therein will occur. Such losses may be due, for example, to eddy currents. The reduction of such losses is most desirable and efforts have, therefore, been made to reduce these losses. In the case of MHD generators, Patent No. 957,242, issued to J. E. Noeggerath, May 10, 1910, Patent No. 1,196,511, issued to H. E. Borger, August 29, 1916, and Patent No. 1,916,076, issued to E. Rupp, June 27, 1933, are exemplary of the three basic and known approaches to reduction of the short circuiting effect present in such devices.

Briefly, the Noeggerath patent which illustrates the first approach contemplates variation in the cross section of the duct and also in the field strength whereby a comparatively high electromotive force is induced in the electrically conductive fluid at the central portion of the duct, while gradually decreasing electromotive forces are induced toward the ends of the duct. By reason of this structure, it is stated that the distance from the point of maximum induced electromotive force to a point of zero electromotive force may be made so great that the short circuiting effect of the fluid used in the magnetic field is practically negligible.

The Borger patent, which illustrates the second approach, contemplates avoidance of the tendency of short circuiting through the conductive fluid or material within the duct by placing partitions or vanes of insulating material within the duct that extend consecutively through the fluid path adjacent the electrodes. It is stated that the vanes may extend some distance from the electrodes toward the inlet and outlet portions of the duct.

The Rupp patent, which illustrates the third approach, contemplates substantial elimination of the short circuiting effect by subdividing or interrupting the stream of electrically conductive fluid in the duct to form individual parts which are successively passed through the magnetic field.

Because, for example, of the present day use of a high pressure electrically conductive gas, the temperature of which is preferably in the range of about 4000° F. or more for air or combustion products and perhaps 2800° F. or more for inert gases, and the high velocity of the gas; the aforementioned approaches represent at best only possible means for reducing the short circuiting effect that may well prove to be practically inoperative, and at worst means that have not attained substantial, if any, commercial application with all of the implications implicit therein.

In the case of electromagnetic pumps, the basic conception of utilization partitions or vanes as taught by the Borger patent is practically exemplified, at least on a small scale, in Patent No. 2,558,698, issued to E. J. Wade, June 26, 1951.

Briefly described, the objectives of the present invention are achieved by and reside in cooling of the plasma or conductive gas such as, for example, by injection of a nonconductive gas into the electrically conductive gas of an MHD generator at a point downstream of the electrodes to reduce the conductivity of the electrically conductive gas and thereby reduce the short circuiting effect at this point.

In view of the foregoing, it will be apparent that it is an object of the present invention to improve the efficiency of MHD generators by reducing losses therein due to eddy currents in the electrically conductive gas.

Another object of the present invention is the provision of improved apparatus for more efficiently transforming the kinetic energy of an electrically conductive gas into electric energy.

The novel features that are considered characteristic of the present invention are set forth in the appended claims; the invention itself, however, both as to its organization and method of operation, together with additional objects and advantages thereof, will best be understood from the following description of specific embodiments when read in conjunction with the accompanying drawings, in which:

FIGURE 3 is a diagrammatic illustration of another embodiment of the present invention utilizing tubes for injecting into an MHD generator layers of a nonconductive gas;

FIGURE 4 is a cross sectional view taken along line 4—4 of FIGURE 3;

FIGURES 5 and 6 are fragmentary side views illustrating tubes for injecting a non-conductive gas into an MHD generator duct;

Figure 1:
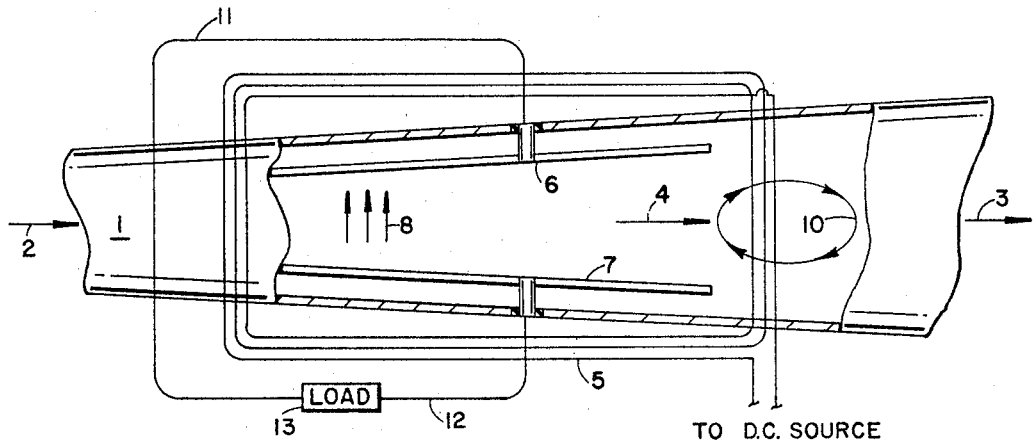
FIGURE 1 is a diagrammatic illustration of an MHD generator.

A knowledge of the general principles of MHD generators will promote an understanding of the present invention. For this reason, there is shown in FIGURE 1 a schematic diagram of an MHD generator. As illustrated in that figure, the generator comprises a duct, generally tapered and designated by the numeral 1, to which high temperature, high pressure, electrically conductive gas or plasma is introduced, as indicated by the arrow at 2, and from which it exhausts, as indicated by the arrow at 3. The pressure at the exit of the duct is lower than at its inlet; and for this reason the plasma moves at high velocity through the duct, as indicated by the arrow at 4. By properly choosing the pressure differential and shape of the duct, the plasma can be made to move through the duct at substantially constant velocity, which is desirable, although not necessary, to the operation of the generator. Surrounding the exterior of the duct is a continuous electrical conductor in the form of a coil 5 to which a unidirectional electrical current may be supplied from any conventional source or from the generator itself. Flow of electrical current through the coil establishes a magnetic flux through the duct perpendicular to both the direction of plasma flow and the plane of the paper.

Within the duct are provided opposed electrodes 6 and 7. These electrodes may extend along the interior of the duct parallel to the direction of plasma movement and may be positioned opposite one another on an axis perpendicular to both the direction of plasma movement and the magnetic flux. High velocity movement of the electrically conductive plasma through the magnetic field induces a unidirectional electromotive force between the electrodes, as indicated by the arrows at 8. The gradient of the magnetic field downstream of the electrodes 6 and 7 sets up eddy currents as indicated by the arrow 10. Eddy currents (not shown) are also set up upstream of the electrodes 6 and 7. However, the present invention is not directed to reduction of these upstream eddy currents.

The electrodes 6 and 7 are connected by conductors 11 and 12 to a load 13 through which electrical current flows under the influence of the electromotive force induced between the electrodes.

From the foregoing description, it will be immediately recognized that an MHD generator of the type described employs a stationary magnetic field and unidirectional gas flow. As a result, such a generator is inherently a source of direct current. If alternating current is desired, specially designed generators or auxiliary equipment must be provided to invert the direct current to alternating current. Further, such a generator is inherently subject to eddy current losses downstream of the electrodes.

Figure 2:
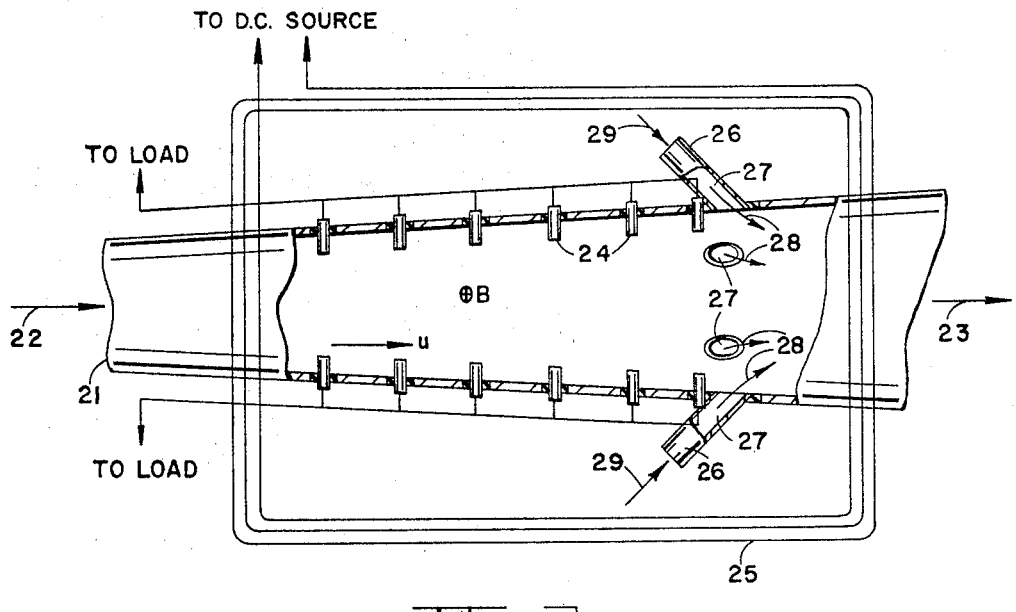
FIGURE 2 is a diagrammatic illustration partly in section of an MHD generator incorporating the present invention.

With reference now to FIGURE 2, there is shown diagrammatically a divergent duct 21 composed of a suitable nonconductive material. High temperature, high pressure, electrically conductive gas or plasma introduced into the inlet of the duct as indicated by the arrow 22 flows at high velocity through the duct as indicated by the arrow $u$, and is exhausted from the outlet of the duct as indicated by the arrow 23. Oppositely disposed segmented electrodes 24 are provided within the duct 21. The duct is surrounded by a continuous electrical conductor in the form of a coil 25 to which direct current is supplied from a conventional source (not shown). Flow of electrical current through the coil 25 establishes a magnetic flux through the duct as indicated by the arrow B, i.e., perpendicular to both the direction of plasma flow and the plane of the paper. The electrodes 24 preferably extend along the length of the duct from a point a short distance downstream from about the effective beginning of the magnetic field adjacent the inlet end of the duct to a point a short distance upstream from the effective end of the magnetic field adjacent the outlet end of the duct. The effective beginning and the effective end of the magnetic field may be considered to be at respectively about the upstream and downstream end of the magnetic coil 25. Pipes 26 spaced around the opening into the duct through generally circular exhaust ports 27 are located at about the downstream terminal point of the electrodes 24 to permit the injection into the duct of a nonconductive gas indicated generally by the arrows 28. The pipes 26 are mounted at an acute angle with respect to the outer surface of the duct to facilitate injection of the nonconductive gas into the duct.

As was mentioned previously, the conductive gas or plasma is provided at a high temperature to promote conductivity, which is a function of temperature. Thus, injection of a gas at about the downstream terminal point of the electrodes at a temperature less than that of the plasma, such as, for example, room temperature or lower, functions to lower the conductivity of the plasma to a value sufficient to prevent the flow of appreciable current therethrough whereby short circuit end effects are largely prevented. This will be readily appreciated when it is realized that conductivity of a gas is proportional to the eighth or tenth power of the temperature. For example, a plasma at 3200° C. may have a conductivity of 10–100 mhos/meter depending on the plasma and seed concentration and a reduction in the temperature of the plasma of 200° C. can result in a change in conductivity by a factor of two.

The cool, or nonconductive, gas is supplied to the pipes 26 from a suitable source (not shown) as indicated by the arrows 29 and may be water vapor, nitrogen, air, or almost any nonconductive gas. Where the plasma after passing through the generator is utilized as a working fluid to generate steam which in turn is used to drive a conventional turbine, the injection of a cool gas is effective to decrease the overall temperature of the working fluid to a point compatible with the optimum inlet temperature for the boiler. In fact, where a boiler is to be supplied with the gas exhausted from the generator, it may well be necessary to effect substantial cooling of the gas to the boiler inlet temperature. In this case, injection of a cool gas accomplishes the twofold purpose of cooling the gas to a desired temperature and reducing short circuit end effects.

It is to be noted, however, that the present invention is not limited in the kind or type of nonconductive gas used nor is it necessary that the nonconductive gas be injected at a point immediately downstream of the electrodes. Further, the nonconducting gas may be at elevated temperatures, (as well as reduced temperatures) so long as it is substantially nonconductive in nature.

Most of the eddy current losses will occur within one duct diameter from the downstream end of the electrodes. Thus, although it is preferable that the nonconductive gas be introduced as close to the furthermost downstream electrode as possible, satisfactory results will be obtained if the nonconductive gas is introduced at a distance downstream from the electrodes that is small with respect to the diameter of the duct at the furthermost downstream electrode. As a practical matter, the furthermost upstream point of injection should not be further from the last downstream electrode than about one-fourth of the diameter of the duct at the furthermost downstream electrode. However, as used in the claims, "the downstream terminal point of said electrodes" is to be considered as including the portion of the duct located between about the last electrode in a downstream direction and the effective end of the magnetic field.

For optimum operation a sufficient volume of nonconductive gas should be injected to eliminate or substantially reduce eddy currents for a distance of about one diameter of the duct at the terminal point of the electrodes. Such a volume of gas will, of course, be determined by the heat content of the conductive gas, its velocity, and the dimensions of the duct.

If the effective magnetic field extends past the last downstream electrode, this will tend to produce a back electromotive force which opposes the end effect eddy currents. In this case, the nonconductive gas may be injected downstream of the electrodes but within the magnetic field and well within a duct diameter at the last downstream electrode.

The injection into the duct of a gas having little or no conductivity as compared to the conductivity of the plasma in the manner described in connection with FIGURE 2 to effectively reduce the conductivity of the plasma at about the downstream terminal point of the electrodes for a distance of about one diameter of the duct at this point will require a relatively large volume of gas. It would be highly desirable if this volume of gas could be reduced without a disproportionate, or any, increase in short circuit end effects over that otherwise possible. Obviously, if less gas is required, less effort and expense would be required to provide it, and the exit temperature of the plasma would be raised. It will be appreciated that this last point is important if the plasma after passing through an MHD generator is supplied as a working fluid, for example, to a conventional steam turbine driven generating plant.

FIGURE 3 shows an arrangement for preventing or substantially reducing end effect short circuits downstream of the electrodes and that is more effective and that permits the use of a smaller volume of nonconductive gas than that required for the embodiment illustrated in FIGURE 2.

With reference now to FIGURE 3 and FIGURE 4, there is shown a duct, electrodes and coil identical to that shown in FIGURE 2. The unidirectional electromotive force generated between the electrodes is indicated by the arrow E. As shown in FIGURE 3 and FIGURE 4, a plurality of hollow tubes 35 extending consecutively through the path of the conductive gas and across the duct 21 are provided at the downstream terminal point of the electrodes 24. The tubes 35 may be made of a material having low electrical conductivity, are provided with exhaust ports 36 on their upstream side, and pass through opposite sides 37 and 38 of the duct for connection to respectively inlet headers 39 and 40. As best shown in FIGURE 4, the nonconductive gas from a source (not shown) is supplied under pressure as represented by the arrows 41 to the inlet headers 39 and 40 and thence to both ends of the tubes 35 and thereafter injected into the duct 21 through exhaust ports 36 in tubes 35. The exhaust ports 36 are of conventional configuration to exhaust an even supply of gas along the length of each tube. Although the exhaust ports 36 may be located on the downstream side of the tubes 35 if desired, location of the exhaust ports on the upstream sides of the tubes is preferred for the reason that as the injected cool gas is forced back over the tubes by the high velocity plasma, as indicated by the arrows 42 in FIGURE 3, additional cooling of the tubes is achieved. First, the continuous passage of cool gas through the tubes removes heat therefrom and passage of the injected gas back over the tubes results in the removal of additional heat and, more importantly, tends to prevent the high temperature plasma from directly contacting the tubes, thereby reducing current and heat flow from the plasma to the tubes. Further, since the tubes will be covered by a substantially nonconducting gas and thus insulated from the plasma, they may be made of conductive material and hence be efficient electrical conductors where such is desired.

As the nonconductive gas from each tube travels downstream it mixes with portions of the plasma to effectively form a plurality of insulating barriers by reason of its decreased temperature and, hence, low conductivity as compared to that of the rest of the conductive gas or plasma. By reason of the insulating barriers or cool portions of the space enclosed by the duct, the presence of eddy currents is substantially reduced, if not eliminated. The number of tubes, their spacing, and the volume of nonconducting gas injected into the duct are chosen on the basis of calculations and experience to balance economic factors and electrical efficiency.

The exhaust ports in the tubes may take several forms. For example, where the nonconductive gas is introduced at both ends of the tubes as indicated by the arrows 41 the exhaust ports may extend over the length of the tubes and increase in width toward the center of the duct as shown in FIGURE 4, or a plurality of passages 43 may be provided as shown in FIGURE 5 to provide an even flow of gas along the length of each tube. Alternately, as shown in FIGURE 6, if the nonconductive gas is supplied to one side of the tubes as indicated by the arrow 44, passages or an exhaust port 45 may be provided that increases in width from, for example, side 38 of the duct to the other side 37 of the duct where the tubes are terminated. Further, if desired, the tubes may have an aerodynamic configuration to reduce stresses on them.

In order to prevent undue restriction of the outlet, the total cross sectional area of the tubes 35 should be as small as practically possible. By way of example, but not of limitation, the total cross sectional area of the injection means, such as, for example, tubes 35, may be about 2% of the cross sectional area of the duct outlet. The tubes 35 in FIGURES 3 and 4 and the tubes 51a–51d in FIGURES 7, 8, and 9 are shown on an enlarged scale to facilitate illustration of the invention.

Thus, it will now be appreciated that the apparatus described in connection with FIGURE 2 is effective to reduce the temperature of at least most, if not all, of the space enclosed by the duct downstream of the electrodes, and that the apparatus described in connection with FIGURE 3 (as well as FIGURE 7 and FIGURE 10) is effective to reduce the temperature and/or conductivity of at least a plurality of spaced portions of the space enclosed by the duct and which extend substantially across the duct at an angle to and downstream of the electrodes.

Figure 7:
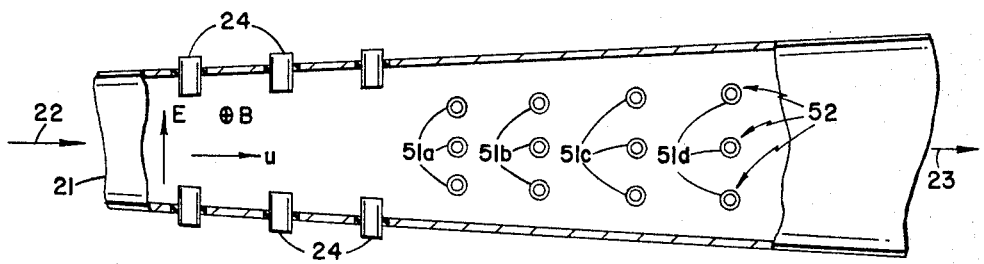
FIGURE 7 is a diagrammatic illustration partly in section of an embodiment of the present invention wherein the plasma may be cooled without the injection of a foreign gas into the duct.
Figure 8:
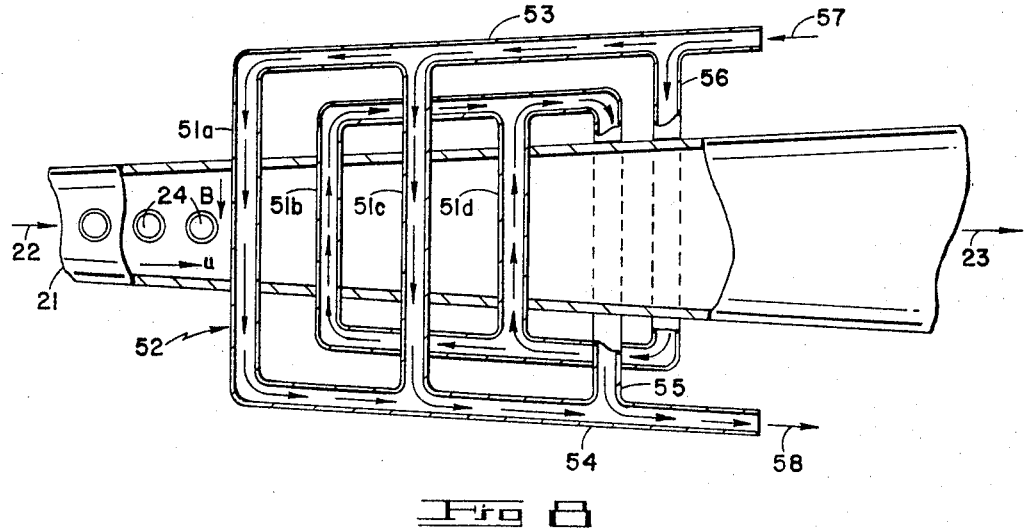
FIGURE 8 is a top view of the embodiment illustrated in FIGURE 7.
Figure 9:
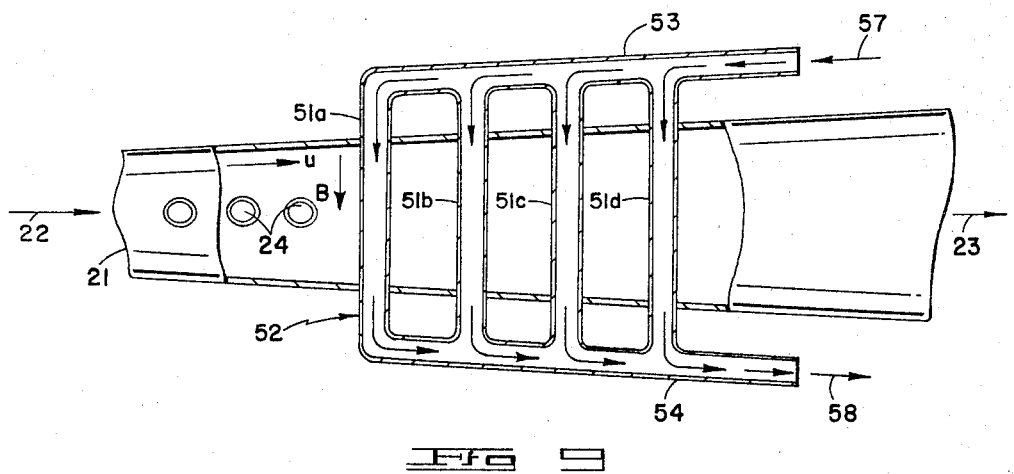
FIGURE 9 is a modification of the embodiment illustrated in FIGURE 7.

There is shown in FIGURES 7, 8 and 9 an arrangement for cooling the plasma or conductive gas without injection of a foreign nonconductive gas into the duct. As shown in these figures, a plurality of hollow tubes 51a, 51b, 51c, and 51d extending across the duct 21 are provided downstream of the electrodes 24. The tubes 51a–51d comprise a plurality of groups 52 in spaced relationship transverse of the plane of the electrodes. Each of the groups 52 extends in the direction of and is parallel to the direction of gas flow. By way of example, but not of limitation, each group 52 is shown as being comprised of four tubes 51a–51d. As shown in FIGURE 8, alternate tubes of each group may be connected to an inlet header 53 and an outlet header 54. The ends of tubes 51a and 51c are directly connected to the inlet header 53 and the outlet header 54 on opposite sides of the duct 21. However, the ends of tubes 51b and 51d on the same side of the duct as the inlet header 53 are connected via conduit 55 to the outlet header 54, and the opposite ends of these tubes are connected via conduit 56 to the inlet header 53. Thus, it will now be seen that upon provision of a coolant indicated by the arrow 57 from a suitable refrigerator (not shown) to the inlet header 53 the coolant will be caused to pass through alternate tubes in opposite directions and returned to the refrigerator through the outlet header as indicated by arrow 58.

As portions of the conductive gas pass over the tubes comprising each group, these portions will be cooled and the passage of a coolant in opposite directions through the tubes prevents the establishment of a temperature gradient across these portions of cooled gas that is higher at one side of the duct than it is at the other side of the duct, as would occur if the coolant is passed through all of the tubes in the same direction. It is to be understood, however, that the coolant may be passed through all of the tubes in the same direction as shown in FIGURE 9.

Figure 10:
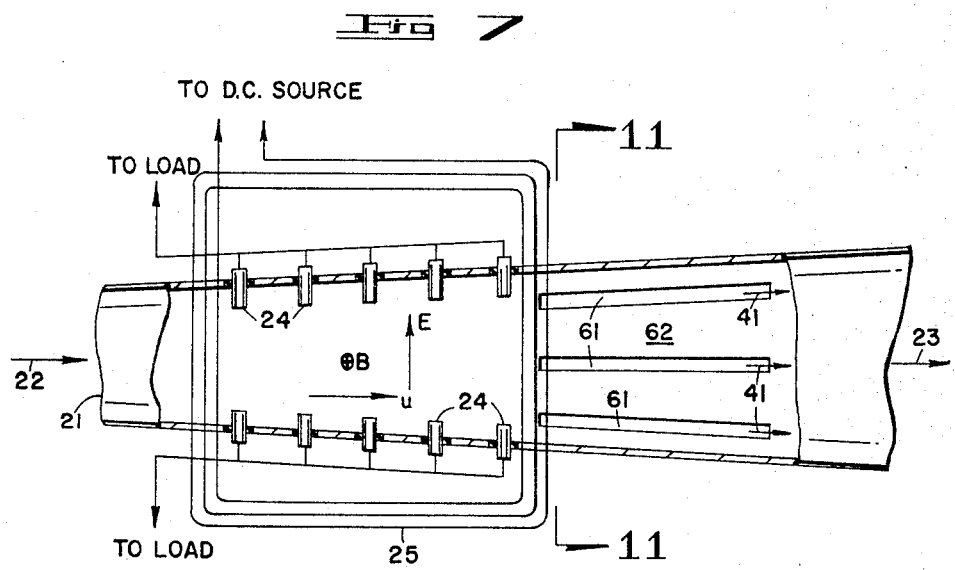
FIGURE 10 is a diagrammatic illustration partly in section of another embodiment of the present invention wherein the cool gas is injected into the duct from exhaust ports in opposite walls of the duct.
Figure 11:
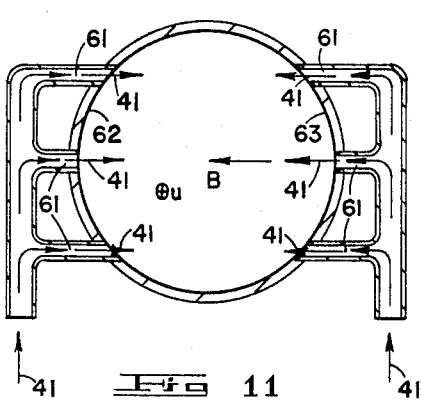
FIGURE 11 is a cross sectional view taken along line 11—11 of FIGURE 10.

A modification of the embodiment illustrated in FIGURE 3 is shown in FIGURE 10 and FIGURE 11. As shown in these figures, the nonconductive gas 41 is injected into the duct 21 from a plurality of oppositely disposed and spaced longitudinal and generally rectangular exhaust ports 61 in the side walls 62 and 63 of the duct 21. Whereas pipes 26 are shown in FIGURE 2 as being radially disposed around the duct 21, the oppositely disposed exhaust ports 61 in the side walls 62 and 63 of the duct as shown in FIGURE 10 and FIGURE 11 are each parallel to the gas flow at that point and generally perpendicular to the plane of the electrodes 24. Exhaust ports 61 may begin at about the downstream terminal point of the electrodes 24 or at a distance therefrom which is short with respect to the diameter of the duct at this point, as is shown in FIGURE 10. The exhaust ports 61 need not extend a distance downstream from the electrodes greater than about one duct diameter.

The embodiment illustrated in FIGURE 10 and FIGURE 11, while not quite as efficient, functions in substantially the same manner as that described in connection with FIGURE 3 to reduce or eliminate end effect short circuits. The embodiment illustrated in FIGURE 10 and FIGURE 11 finds its greatest advantage in the elimination of the tubes of FIGURE 3 and hence, for example, the problems which arise from their presence in the duct and the maintenance problems associated therewith.

The various features and advantages of the invention are thought to be clear from the foregoing description. Other features and advantages not specifically enumerated will undoubtedly occur to those versed in the art as likewise will many other variations and modifications of the embodiments of the invention illustrated, all of which may be achieved without departing from the spirit and scope of the invention as defined by the following claims.

What is claimed is:

1. In a magnetohydrodynamic generator, apparatus for reducing short circuit end effects adjacent the downstream terminal point of oppositely disposed electrodes located within a duct for conveying a hot, electrically conductive gas through a magnetic field at an angle to said electrodes comprising: a plurality of hollow members extending through and secured to opposite sides of said duct at about the downstream terminal zone of said electrodes; and means for maintaining said members at a reduced temperature with respect to the temperature of said gas whereby as a portion of said gas passes over each said members its conductivity is decreased to reduce the flow of current therethrough.

2. In a magnetohydrodynamic generator, apparatus for reducing short circuit end effects adjacent the downstream terminal point of oppositely disposed electrodes located within a duct for conveying a hot, electrically conductive gas through a magnetic field at an angle to said electrodes comprising: a plurality of hollow members extending through and secured to opposite sides of said duct at about the downstream terminal zone of said electrodes, said members being substantially perpendicular to said electrodes; and means for maintaining said members at a reduced temperature with respect to the temperature of said gas whereby as a portion of said gas passes over each said member its conductivity is decreased to reduce the flow of current downstream of said terminal zone.

3. The combination as defined in claim 2 wherein the said hollow members are tubes and said means for maintaining said members at a reduced temperature includes means for passing a coolant through alternate members in opposite directions.

4. A magnetohydrodynamic generator, apparatus for reducing short circuit end effects adjacent the downstream terminal point of oppositely disposed electrodes located within a duct for conveying a hot, electrically conductive gas through a magnetic field at an angle to said electrodes comprising: a plurality of hollow tubes extending through and secured to opposite sides of said duct at about the downstream terminal point of said electrodes, said tubes being substantially perpendicular to said electrodes and having exhaust ports communicating with the interior of said duct; and means for injecting a nonconducting fluid into said duct through said exhaust ports whereby the conductivity of selected portions of said gas downstream of said terminal point is decreased.

5. The combination as defined in claim 4 wherein said exhaust ports are on the upstream side of said tubes and the conductivity of said selected portions of said gas is reduced over a distance equal to about one duct diameter at said terminal point.

6. In a magnetohydrodynamic generator, apparatus for reducing short circuit end effects adjacent the downstream terminal point of oppositely disposed electrodes located within a duct for conveying a hot, electrically conductive gas through a magnetic field at an angle to said electrodes comprising: means for injecting a nonconducting fluid into said duct through a plurality of exhaust ports in opposite sides of said duct, each said exhaust port beginning at about the terminal point of said electrodes and extending downstream for about at least one fourth of a duct diameter at said terminal point, each said exhaust port in said sides of the duct being substantially parallel to the direction of gas flow thereat whereby spaced sheets of gas having a low conductivity extend from about said terminal point of said electrodes to a point downstream a distance of at least about one duct diameter at said terminal point.

References Cited by the Examiner

UNITED STATES PATENTS 957,242   5/1910   Noeggerath.

FOREIGN PATENTS 1,161,079   3/1958   France.

MILTON O. HIRSHFIELD, *Primary Examiner.*

D. X. SLINEY, J. A. HINKLE, *Assistant Examiners.*